United States Patent
Sarac

[11] Patent Number: 5,890,259
[45] Date of Patent: Apr. 6, 1999

[54] TOOL MANIPULATOR

[76] Inventor: Vinko Sarac, 2 Kelly Ridge Rd., Carmel, N.Y. 10512

[21] Appl. No.: 951,905

[22] Filed: Oct. 16, 1997

[51] Int. Cl.[6] .................................................. A47B 95/02
[52] U.S. Cl. ............... 16/110 R; 16/114 R; 16/DIG. 41; 294/25
[58] Field of Search .............................. 16/110 R, 111 R, 16/114 R, 113, 115, DIG. 12, DIG. 41; 294/25, 58; 81/177.2, 177.1, 489, 427.5

[56] References Cited

U.S. PATENT DOCUMENTS

| | | | |
|---|---|---|---|
| D. 339,966 | 10/1993 | Burnett | D8/13 |
| 3,773,375 | 11/1973 | Nehls | 294/57 |
| 4,196,742 | 4/1980 | Owen, Jr. | 135/71 |
| 4,866,922 | 9/1989 | Clark | 56/400.04 |
| 4,888,846 | 12/1989 | Natale | 15/236.01 |
| 4,924,924 | 5/1990 | Stewart | 16/114 R |
| 4,991,386 | 2/1991 | Dirksen | 56/400.12 |
| 5,050,261 | 9/1991 | Hofacker | 15/144 R |
| 5,379,758 | 1/1995 | Snyder | 16/110 R |
| 5,471,698 | 12/1995 | Francis et al. | 16/112 |
| 5,564,451 | 10/1996 | Hagberg | 135/68 |

*Primary Examiner*—Chuck Y. Mah
*Attorney, Agent, or Firm*—William C. Crutcher

[57] ABSTRACT

A multipurpose tool holder with a frame and pivoting ring fitting over the arm has a first handle to grasp when only the forearm is inserted and a second handle to grasp when the full arm is inserted, the pivoting ring allowing bending of the elbow. A tube with a keyless chuck serves as the second handle and receives the end of a tool.

11 Claims, 5 Drawing Sheets

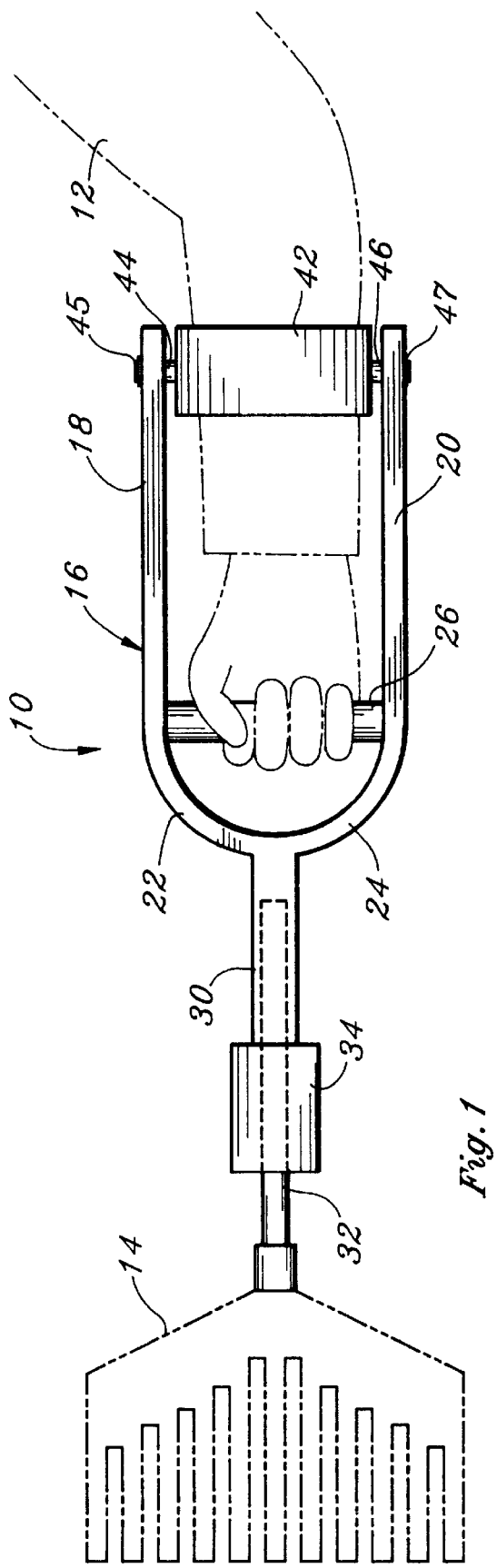
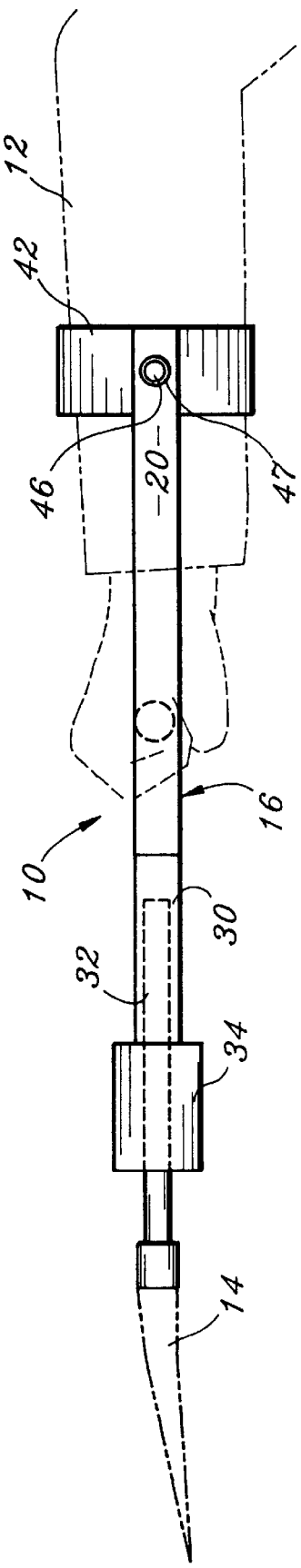

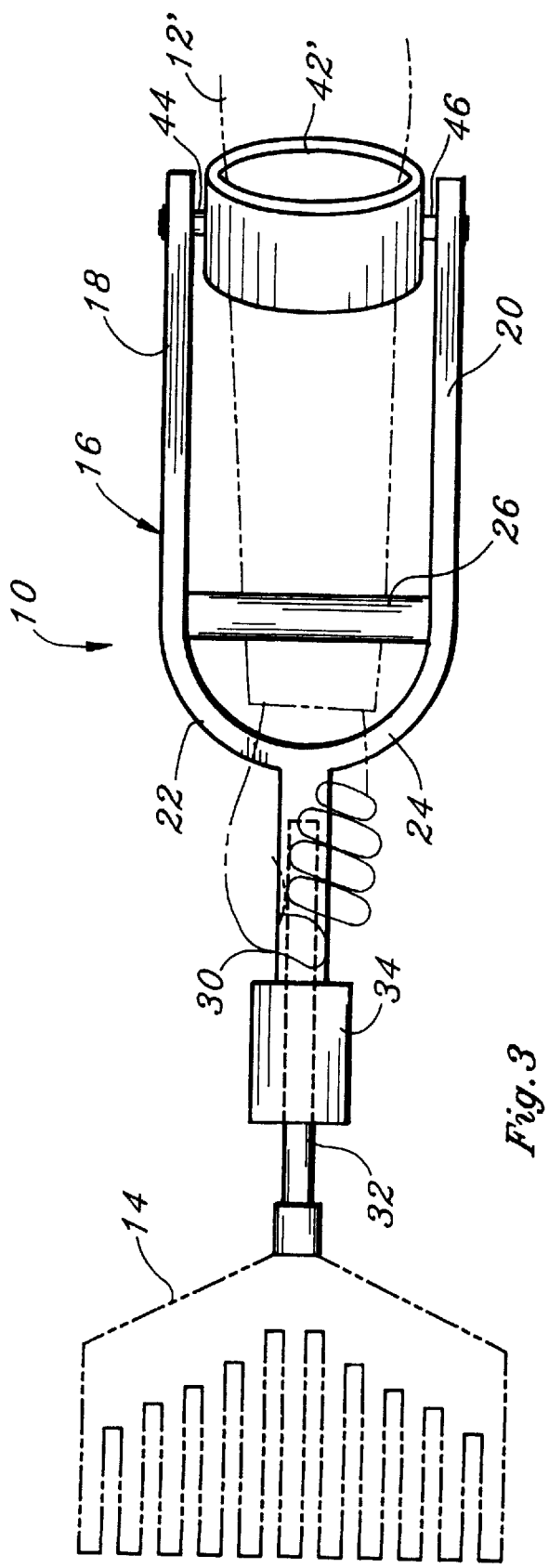
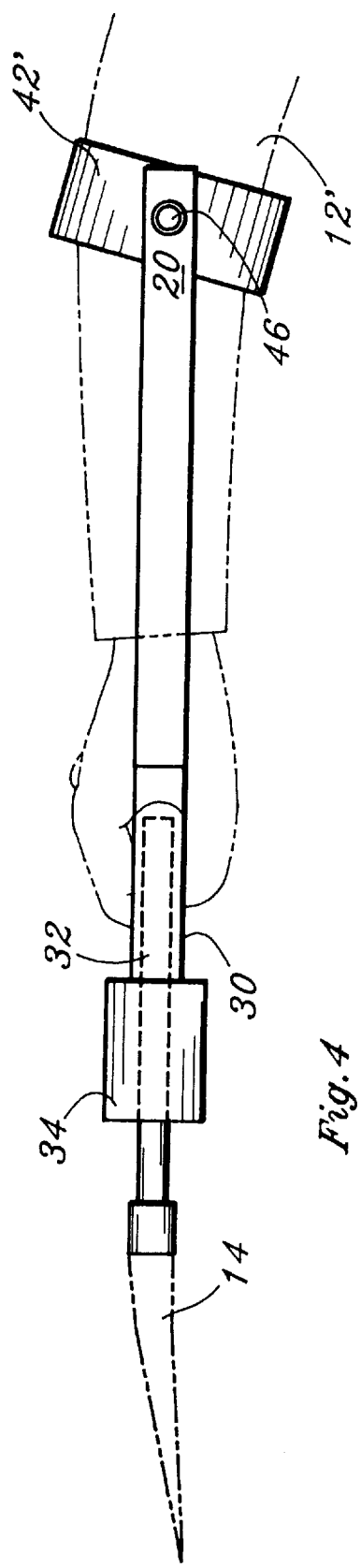
Fig. 3
Fig. 4

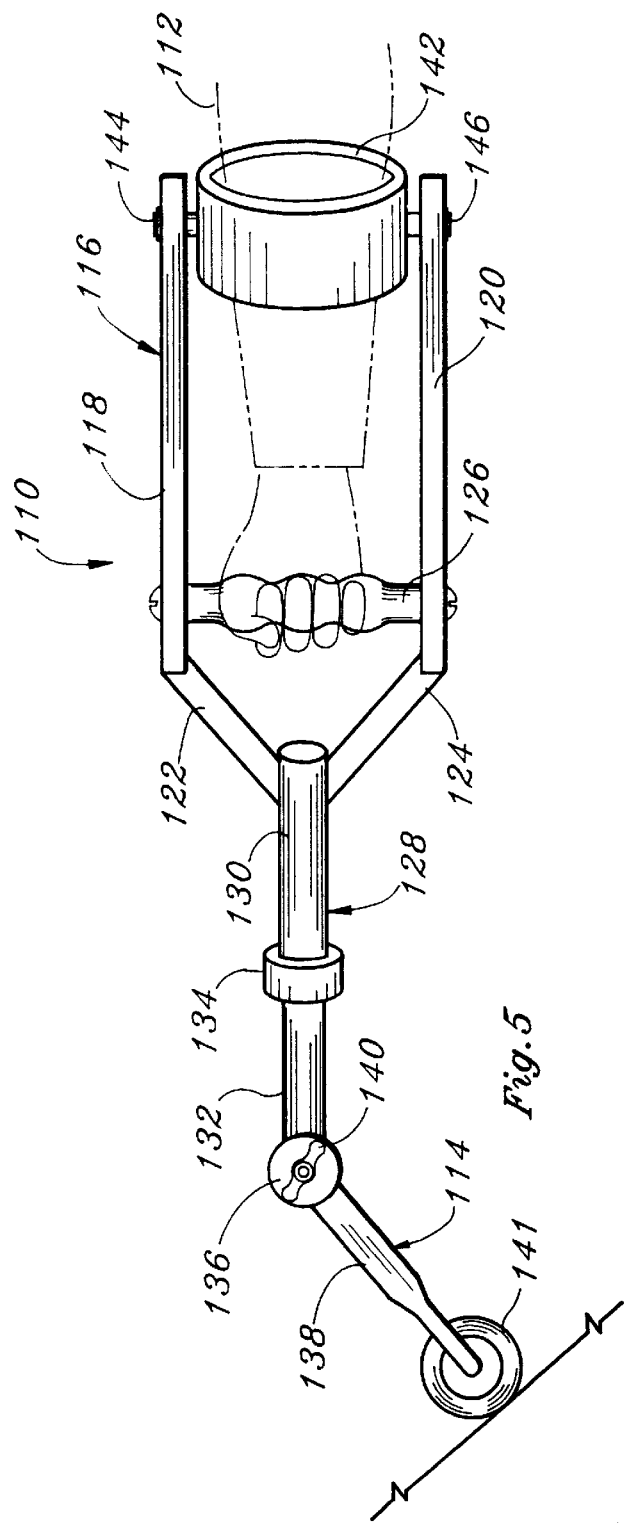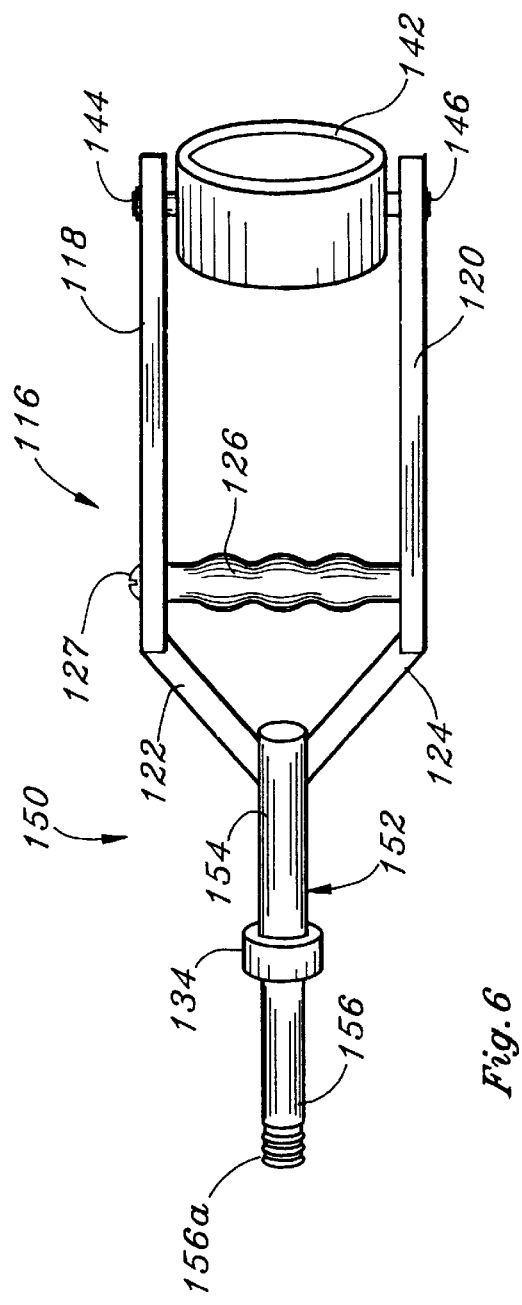

TOOL MANIPULATOR

This invention relates generally to universal handles or tool manipulators for garden tools and the like, and more particularly relates to a multipurpose tool manipulator for extending an operator's reach and manipulating a tool requiring arm and wrist movement.

DESCRIPTION OF THE PRIOR ART

Garden tools, such as rakes and cultivating hoes have handles which are grasped and require extensive arm and wrist movement. Other types of tools, such as paint brushes, paint rollers and the like similarly require arm and wrist movements. Some tools in particular are very tiring on the back, such as garden raking and repetitively picking up the raked leaves or grass. Other types of tools require use beyond the operator's reach, particularly painting in high places from a ladder.

The prior art has suggested special handles or manipulators for such tools to ease the operator's work. U.S. Pat. No. 4,866,922 issued Sep. 19, 1989 to Clark discloses a multipurpose rake with a strap loop attached to the end opposite the rake teeth and a hand grip to be grasped by an operator's hand after extending the forearm through the loop. This requires a special rake head.

U.S. Pat. No. 4,888,846 issued Dec. 26, 1989 to Natale discloses an asbestos scraper with a special extension bracket to allow the operator to apply a greater force to the scraper blade. The scraper is attached by a collar to a frame including a fixed ring which surrounds the forearm and a handle. The ring is rigidly attached to the frame and the handle is arranged in the frame so that a proper angle is obtained for scraping asbestos with repeated short strokes, i.e., designed for a specific arm movement without articulation of the wrist.

It would be desirable to have a multipurpose tool manipulator which is useful with a variety of standard tools and not requiring special tool handles. It would also be desirable to have a multipurpose tool manipulator for extending an operator's reach and enabling manipulation of the tool with arm, elbow and wrist movements without discomfort.

Accordingly, one object of the present invention is to provide an improved tool manipulator for extending an operator's reach and adapted to fit a variety of tools.

Another object of the invention is to provide an improved tool manipulator enabling manipulation with both elbow and wrist movements without discomfort to the operator.

SUMMARY OF THE INVENTION

Briefly stated, the invention comprises a multipurpose tool manipulator for extending an operator's reach and manipulating a tool with the operator's arm, the tool manipulator comprising a frame arranged to enclose portions of an operator's arm and hand, the frame including a pair of longitudinal members extending up either side of the arm a ring adapted to surround the operator's arm, the ring being pivotably connected to the ends of the longitudinal members on opposite sides of the ring, a first handle connected between the longitudinal members and arranged to be grasped by the operator's hand, and a tool receiver attached to the end of the frame beyond the first handle, the tool receiver having a tube adapted to serve as a second handle and to receive an end of the tool or a tool attachment therein, and having means for locking the end of the tool in the tube.

In its preferred embodiment, the locking means comprises a chuck disposed on the distal end of the tube for locking the tool end in the tube and also to provide a selected fixed spacing and angular displacement between the first handle and the tool.

DRAWING

The invention will be better understood by reference to the following description, taken in connection with the accompanying drawing, in which:

FIG. 1 is a side elevation view of the tool manipulator according to the present invention, the operator's arm and the manipulated tool being shown in phantom line, used in a first mode of operation.

FIG. 2 is a plan view of the tool manipulator of FIG. 1,

Figure 8:
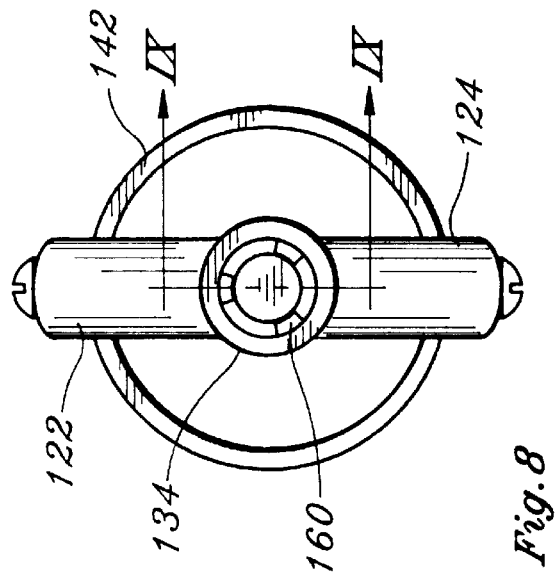
Figure 7:
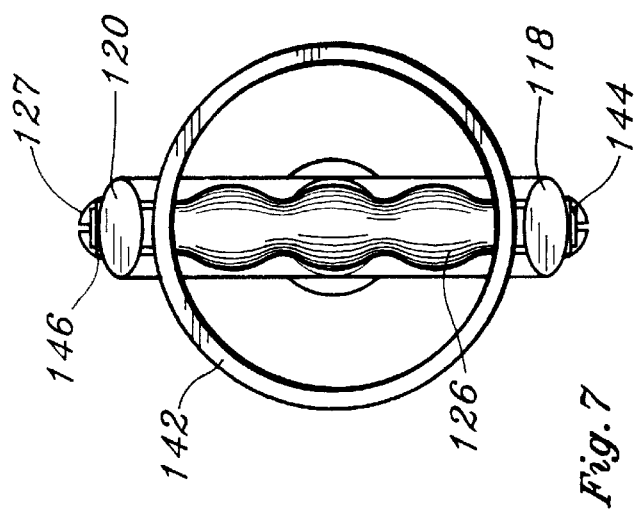
Figure 9:
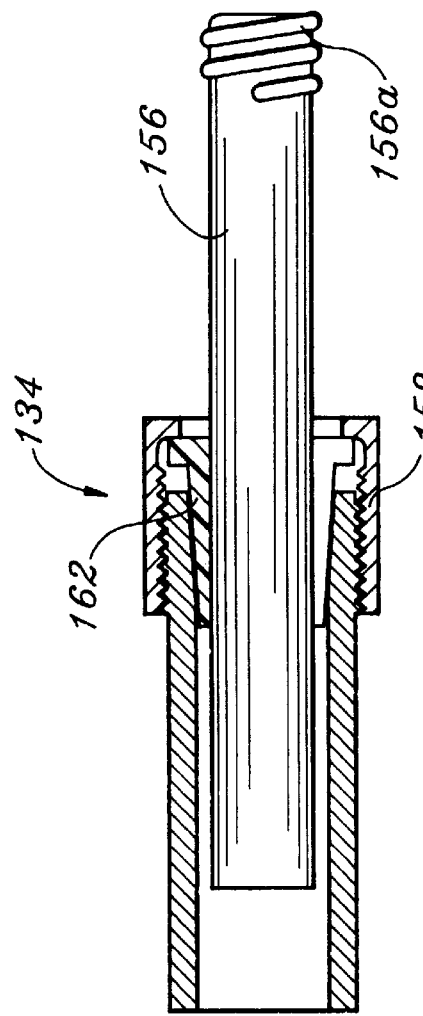
Figure 10:
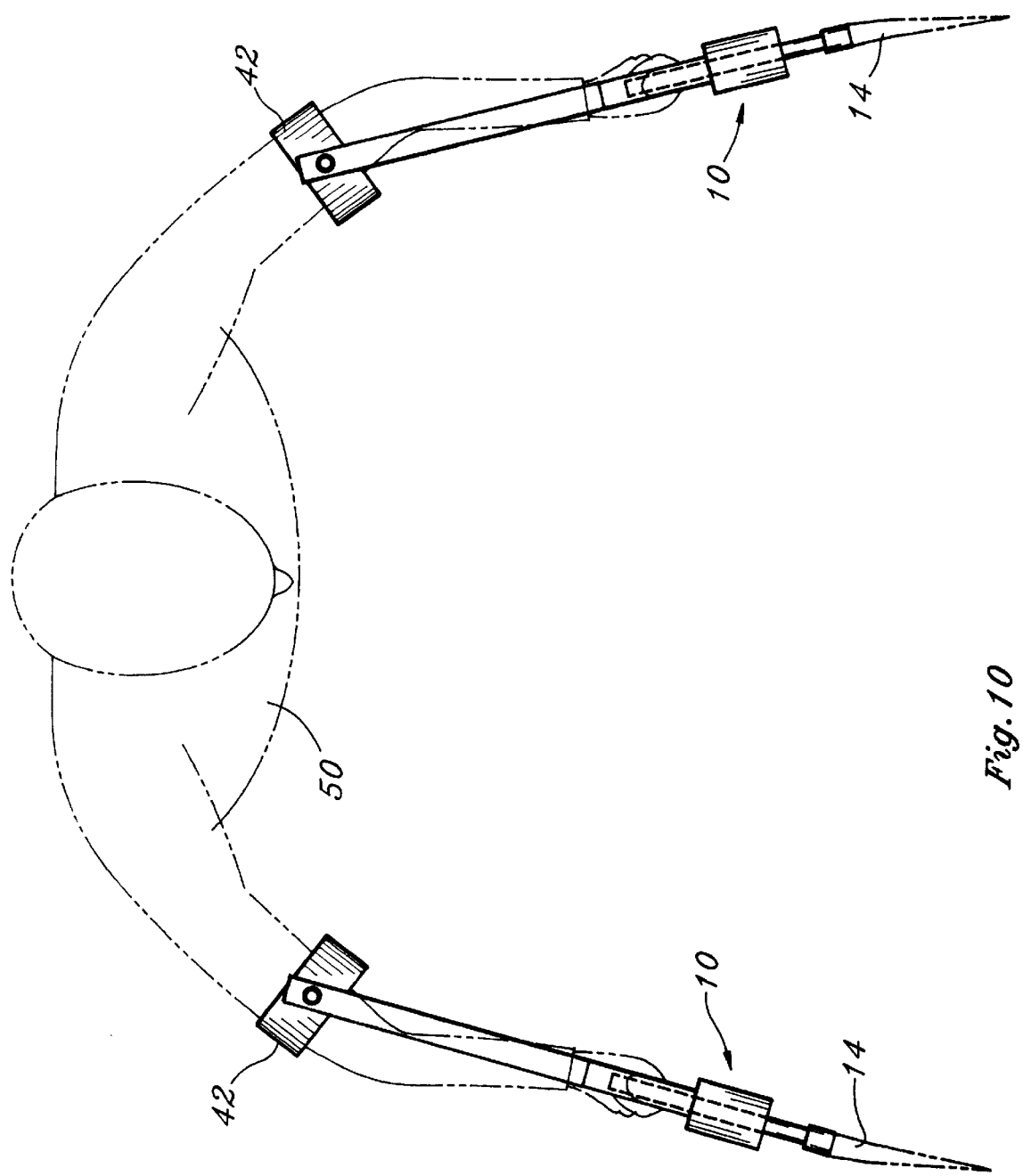

FIG. 3 is a side elevation view of the tool manipulator of FIG. 1, used in a second mode operation, FIG. 4 is a plan view of the tool manipulator shown in FIG. 3, FIG. 5 is a perspective view of a modified tool manipulator used with a different type of tool, FIG. 6 is a perspective view of a second modified tool manipulator, FIG. 7 is a top end view of the manipulator of FIG. 6, FIG. 8 is a bottom end view of the manipulator of FIG. 6, FIG. 9 is an enlarged elevational view in cross section, taken along lines IX—IX of FIG. 8, and FIG. 10 is a simplified view illustrating the operation of the invention.

DESCRIPTION OF THE PREFERRED EMBODIMENT

Referring to FIGS. 1 and 2 of the drawing, a tool manipulator 10 is illustrated in use in a first mode of operation by an operator, portions of whose arm is shown in phantom line at 12. A tool comprising a rake head 14, also shown in phantom line, is attached to tool manipulator 10 in a manner to be described.

The tool manipulator comprises a frame 16 having first and second longitudinal members 18, 20 joined along arcuate portions 22, 24 to a hollow tube 30. A first handle 26 is formed integral with and extends between longitudinal members 18, 20. The end of tube 30 is equipped with a keyless chuck 34 of conventional construction with internal elements designed to contract around the handle of tool 14. The handle, designated in phantom line by reference numeral 32, is a cylindrical rod which extends a selectable distance into the inside of tube 30, where it may be locked in place by manually rotating keyless chuck 34. The handle 32 may also be rotated around its axis to adjust the angular displacement of tool 14 before tightening chuck 34.

A ring or annulus 42 arranged to fit over the arm 12 of the operator is disposed between longitudinal members 18, 20 and connected therebetween by a pivotable connection. This may comprise a pair of pins 44, 46 extending diametrically in opposite directions from the wall of ring 42 and held in place by retaining rings 45, 47. The mounting allows ring 42 to pivot in a plane perpendicular to handle 26.

In the mode of operation shown in FIG. 1 and FIG. 2, the operator's hand clasps the first handle 26 while the forearm fits inside ring 42.

Referring now to FIGS. 3 and 4, the tool manipulator 10 of FIGS. 1 and 2 is shown with the same reference numerals as in FIGS. 1 and 2. The only difference between these drawings is the new position of the operator's arm designated by reference numeral 12' and the new pivoted position of ring 42 designated by reference numeral 42'. Rather than clasping first handle 26, the operator's hand clasps the tube 30 which serves as a second handle. The operator may also alternatively clasp portions of tube 30 and the arcuate elements 22, 24 for a more comfortable grip.

FIRST MODIFICATION

Referring now to FIG. 5 of the drawing, a modified multipurpose tool manipulator is shown generally at 110 which is held by an operator's arm 112 (shown in phantom lines) and used to manipulate a tool attachment 114 carrying a tool, such as a paint roller 141. The manipulator 110 comprises a frame 116, which includes a pair of longitudinal members 118, 120 connected to a respective pair of converging frame members 122, 124. A first handle 126 is attached at opposite ends between the longitudinal members 118, 120 by suitable means, such as bolts 127.

At the end of frame 116 beyond handle 126 is a tool receiver shown generally at 128. Tool receiver 128 in its preferred form comprises an outer hollow tube 130 attached by suitable means between the ends of converging frame members 122, 124. An end 132 of tool attachment 114 extends into tube 130. A keyless chuck 134 is arranged to be manually tightened to fix the distance that tool end 132 of tool attachment 114 extends into tube 130, and also to adjust the angular displacement of the tool attachment.

A swivel plate 136 is connected to tool end 132 and a swivel member 138 is arranged to be tightened against the swivel plate 136 by tightening a thumb screw 140. Swivel member 138 is connected to a conventional paint roller 141. The swivel plate provides a selected fixed angle between the end 132 of the tool attachment and the swivel member 138 carrying the tool.

On the end of frame 116 opposite the tool, a ring or annulus 142 is adapted to fit around the arm of the operator, and is pivotably attached at opposite sides thereof to the ends of arms 118, 120. The pivotable connection is accomplished by means of pins 144, 146 extending in diametrically opposite directions and snapped through suitable holes provided for this purpose in the ends of arms 118, 120.

SECOND MODIFICATION

Referring now to FIG. 6 a modified tool manipulator 150 is shown. Most of the elements are the same as those in the manipulator 110 shown in FIG. 5 and have corresponding reference numerals. The frame 116, handle 126, ring 142, pivot pins 144, 146 and longitudinal members 118, 120 are constructed as previously described. A simplified tool receiver 152 includes a tubular outer member 154. A tool attachment 156 for a tool (not shown) is variably extendable into tube 154 and secured by a keyless chuck 134. Tool attachment 156 has a threaded, slightly tapered end 156a adapted to connect to a variety of tools. Depending on the type of tool, the threads could be omitted or the threaded end could be straight without a taper.

In FIG. 7 the top end view and in FIG. 8, the bottom end view reveal further details of the construction. The longitudinal members 118, 120 may be metal or plastic.

Referring to FIG. 9, a suitable construction for a keyless chuck 134 is illustrated. The lower end of tube 154 is threaded to receive a threaded collar 158 containing three tapered segments 160. Tightening the collar 158 contracts the segments 160 by virtue of a tapered interface 162 between the segments and the inside of tube 154 in a manner well known in the art. The end of tube 154 may be slotted so that separate segments are not needed. Any type of conventional chuck is suitable for the invention.

OPERATION

Operation of the invention will be better understood by reference to FIGS. 1–4 and FIG. 10. A first method of using the tool manipulator is illustrated in FIGS. 1 and 2, where light loads are anticipated and where it is desired to increase the operator's reach to the maximum extent. The operator clasps the first handle 26 while the ring 42 serves to steady the tool manipulator. The wrist may be articulated and this is accommodated by slight pivoting action of ring 42.

A second mode of operation is illustrated in FIGS. 3 and 4 where maximum leverage is desired for heavy loads with less reach. The operator grasps the tube 30 which serves as a second handle. Ring 42 surrounds the upper arm of the operator. Here, the maximum pivoting action of ring 42 is utilized to accommodate bending of the operator's elbow as the tool is manipulated.

The spacing and angular displacement of the tool with respect to the operator can be adjusted easily with the manual keyless chuck 34, allowing the tool handle to be slidably or rotationally adjusted within the tube 30.

Referring to FIG. 10 of the drawing, a particularly useful application of the tool manipulator is achieved by using two such manipulators 10 equipped with rakes 14. An operator, indicated by reference numeral 50 slips a manipulator on each arm and uses the two opposed rake members 14 to pick up large quantities of leaves or grass so as to easily deposit the material in a container without bending over. As the arms move and the elbows bend, the pivoting rings 42 accommodate these movements without discomfort.

A variety of tools, such as garden tools including rakes and cultivators, as well as paint brushes and paint rollers may all be used with the same universal multipurpose tool manipulator by simply changing tool heads and readjusting the length and angle required.

While there has been described what is considered to be the preferred embodiment of the invention, other modifications will occur to those skilled in the art, and it is desired to secure in the appended claims all such modifications as fall within the true spirit and scope of the invention.

I claim:

1. A multipurpose tool manipulator for extending an operator's reach and manipulating a tool with the operator's arm, the tool manipulator comprising:

a frame arranged to enclose portions of an operator's arm and hand, said frame including a pair of longitudinal members for extending up either side of said arm, each of said longitudinal members having a free end, a ring adapted to surround the operator's upper arm, said ring being pivotably connected to the free ends of the respective longitudinal members with pivotable connections on opposite sides of the ring, a first handle connected between the longitudinal members and arranged to be grasped by the operator's hand, and a tool receiver attached to the end of the frame beyond the first handle, said tool receiver having a tube adapted to serve as a second handle to receive an end of said tool therein, and having means for locking the end of the tool in the tube, and adapted to provide both longitudinal and rotatable adjustment of said end of the tool in the tube.

2. The tool manipulator according to claim 1, wherein said locking means comprises a chuck disposed on the distal end of the tube for locking the tool end to provide a selected fixed spacing and selected angular displacement between the first handle and the tool.

3. The tool manipulator according to claim 2 wherein the chuck is a keyless chuck having a manually rotatable ring with internal inclined walls, and having gripping elements cooperating with the inclined walls adapted to contract about the tool end when the rotatable ring is rotated.

4. The combination according to claim 1, wherein the ring is arranged to pivot in a plane perpendicular to the first handle.

5. The combination according to claim 1, wherein the frame longitudinal members, the first handle and the tube are molded as an integral plastic member.

6. The combination according to claim 1, wherein the frame longitudinal members, the first handle and the tube comprise separate members, having means for connecting them together.

7. The combination according to claim 1, wherein the ring includes a pair of diametrically opposed pins, and wherein the free ends of the longitudinal members each define at least one hole adapted to receive a respective pin to provide the pivotable connections.

8. The combination according to claim 1, including a tool attachment extending from the tool receiver, said tool attachment having an end adapted to receive various types of tools.

9. The tool attachment according to claim 8, and further including a swivel arm to provide a selected fixed angle between the tool attachment and the tool.

10. The tool attachment according to claim 8, wherein said end of the tool attachment is threaded.

11. The tool attachment according to claim 1, wherein the tool attachment is adapted to receive the handle of a rake.

* * * * *